(12) United States Patent
Hogan et al.

(10) Patent No.: US 7,177,848 B2
(45) Date of Patent: Feb. 13, 2007

(54) METHOD AND SYSTEM FOR CONDUCTING SECURE PAYMENTS OVER A COMPUTER NETWORK WITHOUT A PSEUDO OR PROXY ACCOUNT NUMBER

(75) Inventors: Edward J. Hogan, Larchmont, NY (US); Carl M. Campbell, Newtown Square, PA (US)

(73) Assignee: MasterCard International Incorporated, Purchase, NY (US)

( * ) Notice: Subject to any disclaimer, the term of this patent is extended or adjusted under 35 U.S.C. 154(b) by 403 days.

(21) Appl. No.: 09/886,486

(22) Filed: Jun. 22, 2001

(65) Prior Publication Data

US 2002/0120584 A1 Aug. 29, 2002

Related U.S. Application Data

(60) Provisional application No. 60/225,168, filed on Aug. 14, 2000, provisional application No. 60/213,325, filed on Jun. 22, 2000, provisional application No. 60/195,963, filed on Apr. 11, 2000.

(51) Int. Cl.
*G06Q 99/00* (2006.01)

(52) U.S. Cl. ............... 705/67; 705/65; 705/75; 705/76; 705/79; 713/50; 713/182; 713/155; 380/277; 380/255; 726/2; 726/4; 726/5; 726/9

(58) Field of Classification Search ............ 705/50–80; 713/150, 155, 182, 200–202, 50, 156; 380/277–285, 380/255; 726/2–10
See application file for complete search history.

(56) References Cited

U.S. PATENT DOCUMENTS

| 5,317,636 | A | 5/1994 | Vizcaino | 380/23 |
| 5,724,424 | A | 3/1998 | Gifford | |
| 5,761,306 | A | 6/1998 | Lewis | 380/21 |
| 5,790,677 | A | 8/1998 | Fox et al. | 380/24 |
| 5,883,810 | A | 3/1999 | Franklin et al. | 364/479.02 |

(Continued)

FOREIGN PATENT DOCUMENTS

EP 1 028 401 A2 8/2000

(Continued)

OTHER PUBLICATIONS

60/187620.*

(Continued)

*Primary Examiner*—Jalatee Worjloh
(74) *Attorney, Agent, or Firm*—Baker Botts L.L.P.

(57) ABSTRACT

A method is provided for conducting an electronic transaction with a payment account number having a certain amount of available funds, using a payment network and a "check site". The method comprises the following steps: (a) generating a secret key associated with the payment account number; (b) using the secret key to generate a message authentication code ("MAC") specific to the transaction; (c) generating an authorization request message including the message authentication code; (d) forwarding the authorization request message over the payment network to the check site for verifying the authenticity of the MAC; (e) verifying the message authentication code by the check site using the secret key; (f) responding to the authorization request message over the payment network based on the available funds and the transaction amount.

6 Claims, 1 Drawing Sheet

U.S. PATENT DOCUMENTS

| | | | |
|---|---|---|---|
| 5,903,878 A | 5/1999 | Talati et al. | 705/26 |
| 5,991,412 A * | 11/1999 | Wissenburgh et al. | 705/67 |
| 6,000,832 A * | 12/1999 | Franklin et al. | 700/232 |
| 6,072,870 A | 6/2000 | Nguyen et al. | 380/24 |
| 6,227,447 B1 | 5/2001 | Campisano | 235/380 |
| 6,370,514 B1 | 4/2002 | Messner | 705/14 |
| 6,574,730 B1 * | 6/2003 | Bissell et al. | 713/168 |
| 2001/0034720 A1 | 10/2001 | Armes | 705/65 |
| 2001/0037451 A1 | 11/2001 | Bhagavatula et al. | 713/155 |
| 2001/0047281 A1 | 11/2001 | Keresman, III et al. | 705/2 |
| 2001/0047335 A1 | 11/2001 | Arndt et al. | 705/44 |
| 2001/0051902 A1 | 12/2001 | Messner | 705/26 |
| 2002/0032663 A1 | 3/2002 | Messner | 705/72 |
| 2002/0046169 A1 | 4/2002 | Keresman, III et al. | 705/41 |
| 2002/0052784 A1 | 5/2002 | Sherwin et al. | 705/14 |
| 2003/0120615 A1 * | 6/2003 | Kuo | 705/78 |

FOREIGN PATENT DOCUMENTS

| | | |
|---|---|---|
| WO | WO 01/01622 A2 | 1/2001 |
| WO | WO 01/07873 A2 | 2/2001 |
| WO | WO 01/26062 A1 | 4/2001 |
| WO | WO 01/67215 A2 | 9/2001 |
| WO | WO 01/69556 A2 | 9/2001 |
| WO | WO 01/84509 A2 | 11/2001 |
| WO | WO 02/15077 A1 | 2/2002 |

OTHER PUBLICATIONS

Bruce Schneier, "Applied Cryptography," John Wiley & Sons, Inc., New York, XP002188917, pp. 455-459.

* cited by examiner

METHOD AND SYSTEM FOR CONDUCTING SECURE PAYMENTS OVER A COMPUTER NETWORK WITHOUT A PSEUDO OR PROXY ACCOUNT NUMBER

PRIORITY APPLICATIONS

This application claims priority to U.S. provisional application 60/225,168, filed on Aug. 14, 2000, and entitled "Method and System for Conducting Secure Electronic Commerce Transactions", which is hereby incorporated by reference, and to provisional application 60/213,325, filed on Jun. 22, 2000, with the same title, which is also hereby incorporated by reference. This application further claims priority to U.S. application Ser. No. 09/833,049, filed on Apr. 11, 2001, entitled "An Improved Method and System for Conducting Secure Payments Over a Computer Network, which is hereby incorporated by reference, and which itself claims priority to U.S. provisional application 60/195,963, filed on Apr. 11, 2000, and entitled "Method and System for Conducting Secure Payments Over A Computer Network," and to U.S. application Ser. No. 09/809,367, filed Mar. 15, 2001, entitled "Method and System for Secure Payments Over A Computer Network."

BACKGROUND OF INVENTION

This invention relates to a method and system for conducting secure financial transactions over a communications network and more particularly to a method and system for transmitting payments securely over a computer network, such as the Internet, and for transmitting sensitive information securely over public communication channels.

As is self-evident, on-line commerce has experienced tremendous growth over the last few years but even with that growth consumers are still troubled and concerned about using personal financial information and transmitting such information, such as credit card numbers and personal identification numbers, over public communications networks, such as the Internet. As a result, over the last few years, companies have struggled to find a way—the best way—to ensure the security of payments made over a computer network and to decrease the risk of theft or misuse of financial information.

For example, U.S. Pat. No. 5,883,810 entitled "Electronic Online Commerce Card With Transaction Proxy Number For Online Transactions" and assigned to Microsoft Corporation, is directed to a system which provides for each transaction a temporary transaction number and associates it with the permanent account number; the transaction number looks like a real credit card number and the customer uses that transaction number and submits it to the merchant as a proxy for the customer account number. In this matter, the customer does not have to transmit over a public network his or her real credit card number.

In the '810 patent, the merchant passes along the transaction number to the issuing institution, which in turn uses the transaction number as an index, accesses the real customer account number and processes the authorization, sending the authorization reply back to the merchant under the transaction number. As a result, risk is purportedly minimized not only because the customer only transmits a transaction number but also because the proxy number is good only for a single purchase—theft "would not greatly benefit a thief because it cannot be repeatedly used for other purchases or transactions." Col. 2, lines 60–61.

There is a need to improve upon the prior art systems and in particular there is a need for a method and system for conducting a secure financial transaction over the Internet which avoids requiring the creation and transmission of a unique repeatedly generated transaction number to replace the transmission of the permanent account number for each conducted transaction.

According to the invention of co-pending application Ser. No. 09/809,367, filed Mar. 15, 2001, which is incorporated herein by reference, a "pseudo" account number is assigned to a customer and cryptographically linked to a consumer's payment account number. The payment account number is an account number issued by a financial institution or other organization that a consumer may use to make a payment for goods and/or services. For example, the payment account number may be the account number from a payment card, such as a credit or debit card, or from a payment application, such as an electronic cash application stored on a consumer's computer. The pseudo account number appears to be an actual payment account number to a merchant. That is, the pseudo account number has the same length as a valid payment account number and begins with a valid identification number (e.g., a "5" for MasterCard International Incorporated ("MasterCard")). The pseudo account number is used by the customer instead of the real account number for all of his or her on-line financial transactions.

According to the invention of the co-pending application Ser. No. 09/809,367, all transactions based on pseudo account numbers are preferably cryptographically authenticated using a secret key that is unique for each account number. The authentication may be based on the private key of a public-key pair ("public-key authentication"), or based on a secret key other than a private key ("secret-key authentication"). Thus, if unauthorized persons were to ascertain any pseudo account numbers, they would be unable to make fraudulent transactions using them.

In addition, according to the invention of co-pending Ser. No. 09/833,049, a method of conducting a transaction using a payment network is provided, in which a service provider is assigned an acquirer code. More specifically, the service provider receives a first authorization request for the authorization of a transaction using a first payment account number, wherein:
  (i) the first payment account number has a BIN code associated with the service provider, and is associated with a second payment account number having a BIN code associated with an issuer of said second number;
  (ii) the first authorization request includes an acquirer code associated with an acquirer; and
  (iii) the first authorization request is routable through the payment network to the service provider based on the BIN code of the first payment account number.

The method further includes having the service provider respond to the first authorization request by transmitting a second authorization request for authorization of the transaction using the second payment account number, the second authorization request including an acquirer code associated with the service provider and being routable through the payment network to the issuer based on the issuer's BIN code (i.e., the BIN code of the second payment account number).

Additionally, a response to the second authorization request is received by the service provider from the issuer, where the response includes the acquirer code associated with the service provider and is routable through the payment network based on that code. A response to the first authorization request is then transmitted by the service provider to the acquirer based on the response to the second authorization request, and the response to the first authorization request preferably includes the acquirer code associated with the acquirer and is routable through the payment network based on that code.

In another preferred embodiment of the invention of co-pending Ser. No. 09/833,049, a method is provided of conducting a transaction with a merchant using a first payment account number that is associated with a second payment account number, where the method comprises: (a) generating a message authentication code based on one or more transaction details; (b) transmitting at least the first payment account number and the message authentication code to the merchant; (c) requesting by the merchant an authorization for payment of the transaction using the first payment account number, the request being formatted as if payment were tendered at a point-of-sale terminal with a conventional magnetic-stripe payment card, the message authentication code being transmitted in a discretionary data field contained in a track of the type used in the magnetic stripe of the conventional payment card; (d) responding to the authorization request for the first payment account number by requesting an authorization for payment of the transaction using the associated second payment account number; and (e) accepting or declining the authorization request for the first payment account number based on the response to the authorization request for the second payment account number and the message authentication code.

This system can still be improved upon and security can still be further enhanced to protect the messages and information being transmitted during or in connection with a financial transaction being conducted over public communications lines and such improvements can take place without the use of a pseudo or proxy account numbers.

SUMMARY OF INVENTION

According to the present invention, therefore, a method is provided for conducting an electronic transaction with a payment account number having a certain amount of available funds, using a payment network and a "check site". The method comprises the following steps:

(a) generating a secret key associated with the payment account number;

(b) using the secret key to generate a message authentication code ("MAC") specific to the transaction;

(c) generating an authorization request message including the message authentication code;

(d) forwarding the authorization request message over the payment network to the check site for verifying the authenticity of the MAC;

(e) verifying the message authentication code by the check site using the secret key;

(f) responding to the authorization request message over the payment network based on the available funds and the transaction amount.

In accordance with a preferred embodiment of the invention, the authorization request message is routed over the payment network based on a special bank identification number corresponding to the check site. Software is also preferably located at a user location for generating the secret key.

In accordance with another preferred embodiment of the invention, the authorization request message includes an expiration date field and the message authentication code is placed in the expiration date field.

BRIEF DESCRIPTION OF THE DRAWINGS

Further objects, features and advantages of the invention will become apparent from the following detailed description taken in conjunction with the accompanying figure showing a preferred embodiment of the invention, of which.

Throughout the figure, the same reference numerals and characters, unless otherwise stated, are used to denote like features, elements, components or portions of the illustrated embodiment. Moreover, while the subject invention will now be described in detail with reference to the figure, it is done so in connection with a preferred embodiment. It is intended that changes and modifications can be made to the described embodiment without departing from the true scope and spirit of the subject invention as defined by the appended claims.

DETAILED DESCRIPTION OF THE PREFERRED EMBODIMENT

As mentioned above, the present invention is directed to a method and system for conducting secure electronic commerce (e-commerce) transactions using a payment account number, such as a credit card account number. In a preferred embodiment of the present invention, the payment account number is a virtual payment account number, which is an ISO ("International Organization for Standardization") 7816 account number that is used in electronic transactions and is not necessarily linked to a physical ISO 7816-type card. Alternatively, the payment account number may be a payment account number issued on a physical ISO 7816-type card, or the payment account number may be linked with an account number that is issued on a physical ISO 7816-type card.

In the following detailed description of the invention, there are many references to MasterCard International Incorporated (or MasterCard) and this is done by way of example only and is used as an example of a payment processing facility and particularly one which processes special payment account numbers as described below. Also, the following acronyms may be used:

| | |
|---|---|
| BIN | Bank Identification Number |
| DEA | Data Encryption Algorithm |
| PC | A Consumer's personal computer device |
| MAC | Message Authentication Code |
| MCI | MasterCard International or MasterCard |
| MCWS | MasterCard Website |
| PIN | Personal Identification Number |
| POS | Point of Sale |
| SSL | Secure Socket Layer (for Internet security) |
| TSN | Transaction Sequence Number |
| SVAN | Secure Virtual Account Number |

According to one aspect of the present invention, one or more BINs or BIN ranges of payment account numbers are associated with secure e-commerce transactions. These BIN or BIN ranges are hereafter referred to as the "special" BINs or BIN ranges. A payment account number having a special BIN is hereafter referred to as a "special" payment account number.

According to another aspect of the present invention, a holder of a special payment account number is provided a secret key ("Per-Card Key") that may be used to generate a message authentication code (MAC) when an e-commerce transaction is conducted using the special payment account number.

According to another aspect of the present invention, there is provided at least one facility having a copy of the secret key, which it may use to verify the MAC generated by the special payment account number holder. Such a facility is hereinafter referred to as a "Check Site".

Figure 1:
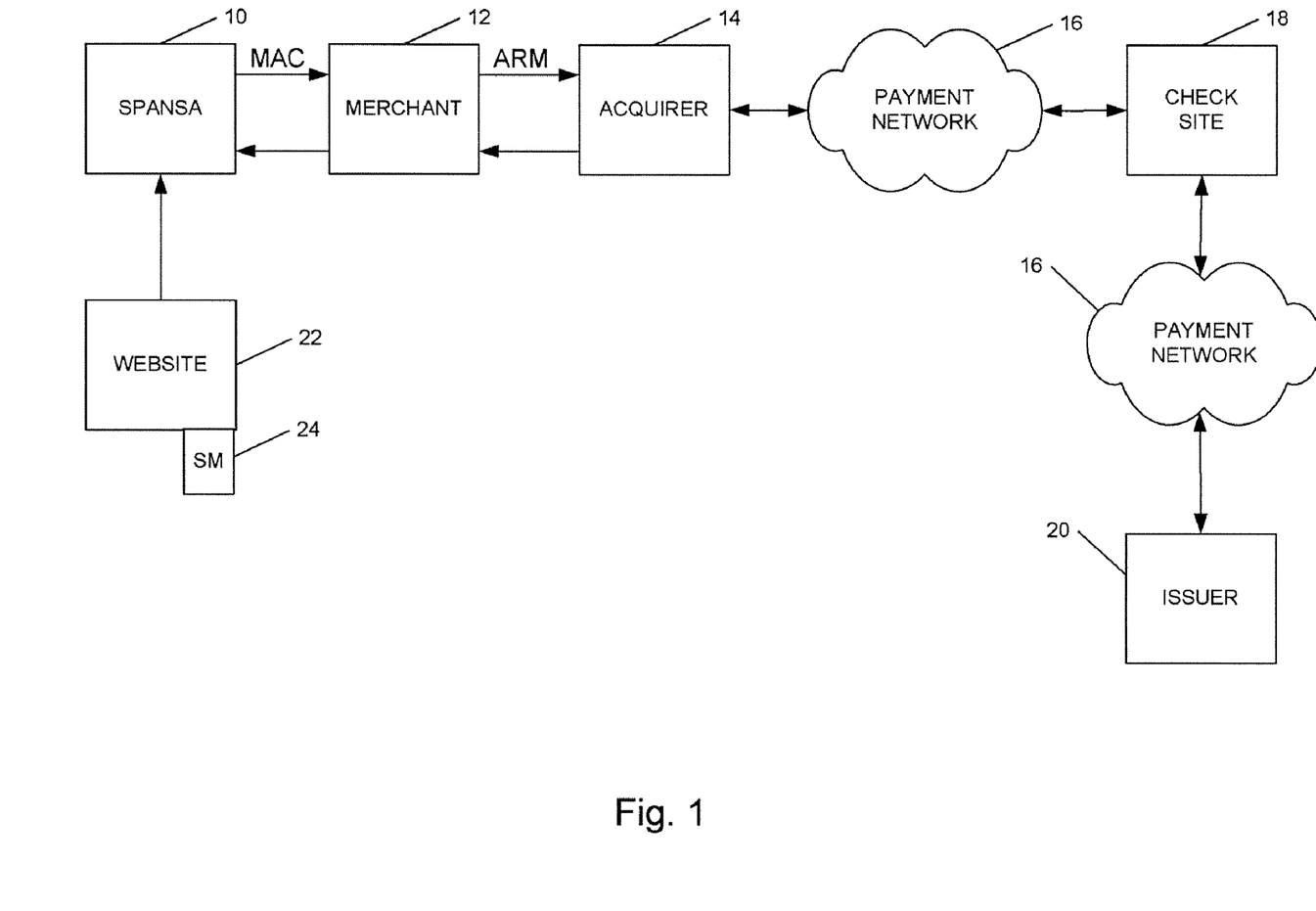
FIG. 1 is a block diagram of the processing components involved in the transaction method in accordance with one embodiment of the invention.

As therefore seen in FIG. 1, there are several processing components to the present invention, which will now be described. A consumer or holder of a special payment account number (SPAN) may be provided at his or her computer 10 with a secure special payment account number software application (SPANSA). The SPANSA maintains the secret key associated with the SPAN, which key is used to generate the MAC. The MAC is sent to the originating merchant 12, which forwards an authorization request message (with MAC) to an acquirer bank 14 to start the authorization process.

The e-commerce transactions using the special payment account numbers are preferably authorized through a payment network 16. For example, if the special payment account numbers are MasterCard credit card numbers, they may be authorized through MasterCard's Banknet payment network. Authorization request messages and authorization response messages for the special payment account numbers are routed through the payment network 16 to the Check Site 18 based on the special BINs of the account numbers. To that end, for example, the computers of acquirer and issuing institutions that interface with the payment network 16 may contain look-up tables indicating that the special BINs correspond to the Check Site 18. The computer or computers of the Check Site 18 that interface with the payment network, however, would contain look-up tables indicating the issuers that correspond to the special BINs.

In accordance with the present invention, when a Check Site 18 receives an authorization request message, it may verify the MAC associated with the transaction using the secret key associated with the special payment account number. In addition, the Check Site 18 may relay the authorization request message to the issuer 20, i.e., the institution that issued the special payment account number. The Check Site 18 would respond to the authorization request message with the indication of whether the MAC was verified and/or with the authorization response from the issuing institution.

If the Check Site 18 forwards an authorization request message to an issuing institution, the Check Site may indicate to the issuing institution 20 whether the MAC was verified. As an example, assuming that the special payment account number were a MasterCard credit or debit card account number, the Check Site could indicate, in its outbound Banknet or MasterCard Debit Switch debit message to the issuing bank, that it had verified the MAC. This indicator could be a new defined value for the current security indicator field used in MasterCard's "0100/0200" type messages. The Check Site may, on all transactions, wipe out and clear the incoming security level indicator field and, on output, post its derived security level result (i.e., whether the MAC was verified).

In an exemplary transaction using a special payment account number, due to the special BIN range, the issuing bank authorization response message routes back to the Check Site. If the authorization response message indicates approved, the Check Site 18 will indicate "approved" along with an indicator back to the acquirer that the MAC was verified. The acquirer 14 will in turn send a message back to the originating merchant 12. In this way, a merchant would know, through its acquirer, not only that the issuing bank has approved the transaction but also that the Check Site has validated the MAC, which means the transaction must have originated from the cardholder and can be a "guaranteed" transaction.

As mentioned, the SPANSA may be stored on the computer of a special PAN holder. In addition to a computer, the application may be stored in a cellular phone or a personal digital assistant (PDA). Preferably, the special PAN holder may request the application over the Internet from a website 22 (for example, an issuer's website or any other suitable location, including the Check Site). This website preferably is coupled or has access to a hardware security module 24 with the ability to create an account-specific secret cryptographic key, such as a DES key. Each security module preferably contains one or more "Derivation Keys" that are used to create and re-create the account-unique secret cryptographic keys.

The secure PAN application stored on the holder's computer may include a transaction sequence number (as described more fully below) and need not communicate with a Check Site or other support site on every transaction. Instead, the application stored on the special PAN holder's computer could communicate and synchronize its transaction sequence counter with a Check Site or other support site at whatever interval a particular issuing institution desires.

The present invention may also be used with a remote wallet server. In this case, the secure PAN application is not stored, managed or maintained in a special PAN holder's computer system. Advantageously, in this embodiment, the present invention enables the use of a generic Internet browser by the special PAN holder, which browser is used to access the remote wallet server (which has the secure PAN application stored thereon). In this embodiment, the local system of the special PAN holder need not contain any additional software or functions beyond the generic Internet browser.

Advantageously, the present invention allows the use of a real virtual primary account number. In contrast to systems utilizing pseudo or proxy account numbers, the present invention may be switched by an acquiring computer without translation and requires no changes to back-end switching or processing functions.

In contrast to systems utilizing pseudo or proxy account numbers, the present invention also: 1) simplifies all clearing processes by eliminating the need to send any clearing files to a central site; 2) eliminates the need for any chargebacks needing to be sent to a central site; 3) eliminates the need for all retrieval requests made by cardholders after transactions are posted to their billing statements from being sent to a central site system to translate to real account numbers. Cardholders are provided and use real account numbers for these transactions.

In contrast to systems utilizing pseudo or proxy account numbers, the present invention also eliminates the need to create and manage the storage of transaction logs needed to translate a special payment account number to a real account number.

The MAC may be transmitted to the Check Site in any number of ways. Examples of methods of transmitting the MAC to the Check Site follow.

MAC Option 1

In this embodiment, the MAC is placed in the card expiration date field and acts as a "pseudo expiration date." The MAC generation is described more fully below. In this embodiment, there are no changes required to a merchant site. The only possible additional requirement for a merchant would be the merchant's ability to accept, but not necessarily use, an additional authorization response field in the message from an acquirer indicating that the transaction MAC has been authenticated. The field, which would be used for this indicator, could be any currently supported field in normal bankcard authorization messaging POS systems.

MAC Option 2

This embodiment may be used in conjunction with the other options. In this embodiment, a cardholder's computer or a remote wallet server maintains a log of merchant data related to the transaction. For example, the cardholder's computer or the remote wallet server could log:
  (a) the transaction MAC;
  (b) the merchant's web address (URL);
  (c) the merchant's Secure Sockets Layer (SSL) certificate serial number, and/or
  (d) the entire merchant SSL certificate.

This embodiment provides additional security in that, if the cardholder later tries to dispute a transaction as not having been initiated by the cardholder at that particular merchant, the log could provide sufficient data to refute such a claim. For this embodiment, the merchant website is unchanged.

MAC Option 3

In this embodiment, the transaction MAC is placed in the card expiration date as in Option 1 or 4. The MAC is generated based on a merchant-supplied data element. The merchant-supplied data element would be passed to the cardholder or remote wallet server in an additional separate field, designed for the transport of the merchant supplied data needed to calculate the MAC. One embodiment would be to link a data element that a merchant already holds, such as a merchant's SSL certificate serial number, into the data fields used in the MAC computation. For example, a MAC could be created using the following data elements:
  (a) the PAN,
  (b) the real card expiry date (4 numeric digits MMYY format),
  (c) a transaction sequence number (which is kept in sync by both the cardholder system and the Check Site),
  (d) the day and time of transaction,
  (e) the secure PAN application version number, and
  (f) the data identifying the merchant, such as the merchant's SSL certificate serial number.

This embodiment would involve changes to merchant electronic commerce sites. The merchants would need to modify their systems to send their merchant certificate serial number in the outbound authorization request message. However, this embodiment would supply key merchant identifying data linking the merchant to a particular transaction. The MAC verification step computed by both the cardholder system and the Check Site would both have this additional merchant identifier field. When the Check Site saw that the incoming authorization request message had a merchant supplied certificate serial number, it would use it in the MAC computation to match the same process employed when the cardholder system generated the MAC.

MAC Option 4

In this embodiment, the transaction MAC is placed in both the card expiration date field and in the CVC2 or equivalent field. CVC2 refers to a three digit value that is printed next to the signature panel of some cards. By way of background, ISO 7816 payment cards have a static (at least) 3-digit code that is cryptographically generated by an issuer. In MasterCard payment cards, for example, this code is called CVC2. This value is generated by an issuing bank using a secret cryptographic key and can be verified using this same key. This option enables the generation of a longer transaction MAC (i.e., the MAC output size is increased by 3 digits). For this embodiment, the CVC2 (or equivalent code) field would be dynamically generated and filled with the MAC. Merchant sites would need to support cardholder prompting and subsequent transport of the CVC2 or equivalent field.

MAC Option 5

In this embodiment, the transaction MAC is placed in the CVC2 or equivalent field. This embodiment enables the generation of at least a three-digit MAC.

In a preferred embodiment of this option, when a MAC is generated for a transaction, the MAC is checked against the true or static CVC2 value (i.e., the CVC2 value generated by the issuing bank and issued with the payment card). If the generated MAC is equal to the static CVC2 value, the transaction counter of the secure PAN application is incremented, and a new MAC is generated. The new MAC is then compared to the static CVC2 value to determine whether the two values are equal. This process is repeated until the generated MAC value is not equal to the static CVC2 value. When the MAC is verified for a transaction, the verification process compares the received CVC2 value that is sent with the transaction to the static CVC2 value expected for the payment card. If these values are equal, the verification process determines that a secure PAN application has not been used for the transaction, and a MAC has not been sent. If the received CVC2 value is different from the static CVC2 value, the verification process assumes that a secure PAN application has been used for the transaction and the CVC2 field contains a MAC. The verification process then attempts to verify the MAC value in the CVC2 field.

It is not necessary for special payment account numbers to be used with this embodiment (although they may be used). Instead, as described above, the value in the CVC2 field may be used to determine when a secure PAN application is used with a transaction.

General Background Cardholder Authentication

Cardholder authentication may be provided by any number of methods that are known in the art and may be designated by the issuer of the cardholder secure PAN application. A method of authentication includes, but is not limited to, the use of a remote wallet server that is accessed by a cardholder's Internet browser, such as a Netscape or Microsoft Internet Explorer browser, through SSL technology. Here the authentication technique could include the use of user ID and password access and/or the use of chip-card based digital ID authenticated access. In the case of a remote wallet server, the present invention may also include a locally stored application managed and maintained on the cardholder system itself.

Transaction authentication in the present invention is provided by the creation of a MAC over transaction details, as described below.

Account number protection in the present invention may be further increased by the use of a virtual account number, which is of no value for magnetic stripe face-to-face transactions at point-of-sale terminals (because there is no magnetic stripe issued for a virtual account number). With regard to the fact that these virtual account numbers must be within special BIN ranges that indicate that these account numbers need to be routed to the Check Site, each issuing institution would be given specific BIN ranges to use for the virtual account numbers under the present invention.

With the present invention, the need for merchant authentication prior to a cardholder revealing his/her account number is obviated because the account number of the present invention is not usable without its associated transaction-specific MAC. Any attempted fraudulent use of an account number under the present invention, such as a replayed transaction with an old MAC without cardholder authentication, would be routed to the special Check Site, and would not verify for the attempted transaction. All attempted fraudulent replayed transactions thus would fail.

The cardholder may provide a password prior to downloading the secure PAN application or may select a password when the application is installed on the cardholder's PC. If a password is provided or selected, the cardholder will thereafter be required to enter this password in order to activate the application on his or her PC. The password selected by the cardholder may be used to encrypt, or otherwise alter, the secret key. The secure PAN application may be downloaded as part of a digital wallet application.

Generation of an Account-Unique Secret Key

The secret key that is embedded within the secure PAN application is unique for each special payment account number and is preferably derived within a security module using the special payment account number and a derivation key. This derivation key may itself be derived within the same or other security module using a higher-level derivation key. There may be a derivation key for each issuer or for each BIN range. The derivation keys may be, for example, triple-length DEA keys. Any method of encryption known in the art may be used to generate the account-specific key with a derivation key.

The Check Site preferably is coupled to or has access to a security module with copies of the derivation keys therein. When the Check Site receives an authorization request for a special payment account number, the Check Site derives the key needed to verify the MAC by using the appropriate derivation key with the special payment account number.

Generation of a MAC

The following describes an exemplary manner in which a MAC may be generated and used according to the present invention. As described above, the MAC may be placed in the expiration date field of a transaction. The MAC then acts as a "pseudo" expiration date. This pseudo expiration date is formatted MMYY as are all expiration dates. Preferably, in order to operate with the current processing systems of most or all merchants in the marketplace today, the pseudo expiration date should fall within 48 months of the transaction.

Preferably, the secure PAN application (hereinafter also referred to as the "secured application") includes a transaction sequence number, which consists of 20 binary bits and is incremented for every transaction. Thus the number will not cycle from all one's to all zeros until $2^{20}$ or about 1 million transactions have occurred. The secure application may also include a four-bit "version number", which is a number that is unique to each PC or other device in which a secure application for a given account number is resident.

For each transaction processed by the cardholder's secure application, the transaction sequence number is first incremented. The resulting 20-bit number, with the four-bit secure application version number concatenated to the left, is then left-justified in an 8-byte field, padded to the right with binary zeros, and triple-DEA encrypted using the double-length secure application Per-Card key. The result is the 64-bit binary MAC.

Placing the MAC in the Expiration Date Field

The expiration date field of the transaction may then be obtained from the 64-bit binary MAC described above as follows:

1. Selected the left-most "one" bit in the "number of months indicator" (a binary number, explained in greater detail below) and count the number of bit positions from this bit position to the right-most bit (including the bit position of the left-most "one" bit). Call this number "N". For example if the "number of months indicator" is 01010100 (decimal 84) the value "N" is seven. Having determined "N", consider the 64-bit binary MAC, as groups of "N" bits each, ignoring any left-over right-most bits. Starting with the left-most group, select the first group encountered that is less than or equal to the "number of months indicator". If no such group is found, select the left-most group, to this group add "number of months indicators" and from this sum subtract $2^N$, and use this result (which will be >0 and <"number of months indicator") as the selected value.

2. Divide the result of Step 1 by binary 1100 (decimal 12) producing a quotient and a remainder. Covert both the quotient and the remainder into decimal numbers. Add the remainder, as a decimal number (having a value in the range 00 to 11) to the two left-most decimal digits (MM) of the "reference date", also described in greater detail below.

If the result is greater than 12, subtract 12 from the result and in either case use the result as the two left-most digits, MM, of the card expiration date for the current transaction. If obtaining the result required a subtraction of 12, increment (by one) the quotient.

3. Add, mod-100, the two-decimal digit quotient from Step 2, possibly incremented as also indicated in Step 2, to the right-most two digits (YY) of the "reference date". Use the result as the two right-most digits, YY, of the card expiration date for the current transaction.

Placing the MAC in the CVC2 Field or Equivalent

A MAC may be generated as described above or in any manner known in the art. Then, in addition to, or instead of, placing the MAC in the expiration date field, the MAC, or any portion thereof, may be placed in the CVC2 field or equivalent.

Communication between Cardholder and Merchant

Once the secure application has been installed on a cardholder's computer, the cardholder uses the secure application for all Internet payments and the secure application provides the cardholder's special payment account number for all Internet transactions. The fact that this is a secure application transaction is transparent to the merchant. Although the account number is actually a special payment account number, and the expiration date may actually be a representation of a MAC, the merchant is unaware that this transaction is different from any other Internet SSL transaction it receives.

More specifically, whenever the MAC field is supported by the merchant, the secure application uses its embedded, secret key to create a Message Authentication Code (MAC)

relating to the transaction, and places this MAC, and the data on which it is based, in a MAC field, which becomes a portion of the transaction.

Upon receipt of the cardholder's transaction message, the merchant formats a conventional authorization request for the acquirer. This authorization request preferably contains the MAC field as provided by the consumer's PC.

Should a merchant initiate multiple authorization/clearing transactions for a cardholder transaction, only the first of these transactions includes the MAC field and the expiration date. The subsequent transactions include only the payment account number and may be considered as merchant-originated mail-order-telephone-order transactions. This is also true for all recurring payments and partial payments with multiple clearings.

Acquirer Handling of Authorization Request

When an acquirer receives an authorization request message from an Internet merchant, it looks up the issuer BIN in its BIN table. With regard to MasterCard's payment system, if the acquirer determines that the transaction's BIN corresponds to an issuer in another country, it causes the transaction to be routed to MasterCard over its Banknet system. If the acquirer determines that the transaction's BIN corresponds to an issuer in its own country, it may also cause the transaction to be routed to MasterCard via Banknet. Alternatively, in some cases where an issuer is in the same country as the acquirer, the acquirer may normally cause the transaction to be routed directly to the issuer designated by the BIN. In the case of a special payment account number transaction, the transaction preferably will be routed to a central processing facility, preferably to a MasterCard-authorized processing facility (i.e., a Check Site).

In one embodiment of the present invention, some countries may have a special security-module-equipped facility that handles domestic transactions. Each such facility would preferably be set up only with MasterCard's approval and would hold only the cryptographic keys and account-number conversion data for the country whose transactions it processes. In countries with such a national check site facility, all transactions will be sent this facility, so that same-country transactions need not leave that country. A national check site facility to handle domestic transactions may be more efficient than causing all transactions to go through a central processing facility.

Secure Application Initiation

The secure application may be initiated during every transaction, immediately before the secure application-based payment is to be performed. The secure application passes to a payment processing website, preferably to a MasterCard website or server, a request consisting (for example) of the 16-digit special payment account number, the four-decimal-digit expiration date of the payment account number, the four-bit secure application version number, the current value of its 20-bit transaction sequence number, and a 16-bit MAC (Message Authentication Code) based on these latter three values. The MAC might be created by triple-DEA encryption, using the secure application-resident 16-byte Per-Card key, the 16-bit expiration date (as binary-coded-decimal) concatenated (left-to-right) with the four-bit secure application version number concatenated with the 20-bit transaction sequence number, left justified in a 64-bit field and padded to the right with binary ones, then selecting the 16-left-most bits of the resulting cipher-text.

When the website receives this information, it uses a special security-module-equipped secure application system to verify the MAC on the expiration date, secure application version number and the transaction sequence number. If the MAC is verified, this system increments the transaction sequence number (it maintains) to create the "expected transaction sequence number" (ETSN) and causes an update of the ETSN for the special payment account number and secure application version number in question in the secure application authorization system (e.g., the Check Site) that processes secure application authorization requests for the BIN of the indicated special payment account number. This secure application authorization system (the Check Site) will reject the just-received ETSN if it is less than or equal to the highest-numbered ETSN previously received for this special payment account number and secure application version number. This secure application authorization system (the Check Site) is also given the just-received expiration date, and updates the expiration date associated with this special payment account number if it is later than the expiration date currently on record.

This special secure application system preferably sends to the website, which in turn sends to the secure application in the cardholder's PC, the following two data values: 1) a date value referred to as the "reference date", which is a four-digit decimal number with the format MMYY (and which is, in effect, this month's or next month's date), and 2) a data value referred to as the "number of months indicator", which is an eight-bit binary number with a maximum value less than (decimal) 256. This data is also included in the information that is sent to the appropriate secure application authorization system (the Check Site).

Central Processing Facility (and/or National Facility) Handling of the Authorization Request Because of the special BIN of the special payment account number, the acquirer and payment network cause the transaction to be routed to a Check Site.

The Check Site stores, for each secure application version number and special payment account number, a record of the 20-bit highest-numbered ETSN received, along with an indication of whether or not the MAC has been verified for this transaction sequence number. In addition, it stores any "expected transaction sequence numbers" received within the past 48 hours for which the MAC has not yet been verified. Associated with each such expected transaction sequence number, the system also stores an indication of the "reference date" and the "number of months indicator" that apply to each expected transaction sequence number.

The "reference date" is a date value indicating the earliest expiration date that is acceptable in an authorization request message. By way of background, some merchants do not request authorizations immediately, but batch authorization requests together. Therefore, this date is typically one or two days ahead of the date when the transaction is initiated.

The "number of months indicator" indicates the number of months beyond the current date corresponding to the latest expiration date for which a payment card will be accepted. Typically, this number is 48 months.

The Check Site also has, is coupled to, or has access to a security module with the capability to determine the unique, secret 16 byte cryptographic key placed in the secure application of the cardholder's PC when registration occurred. The processing performed by the Check Site is then as follows:

1. Using the security module, determine the cryptographic key unique to this secure application using the appropriate derivation key and the special payment account number.

2. Select the 20-bit ETSN that was received first within the past 48 hours for which a MAC has not yet been verified. Compute the 64-bit MAC on this 20-bit transaction sequence number and its associated secure application version number, as defined above for secure application at the PC. Using the "reference date" and "number of months indicator" specified for the associated ETSN, determine from this MAC an expiration date using the methodology defined above for secure application at the PC. If this expiration date equals the expiration date of the current transaction, the MAC has verified. The entry for this ETSN that resulted in the MAC verification is then marked as "MAC verified" if it is the highest-numbered ETSN for its associated secure application version number, or deleted if it is not the highest number ETSN for its associated secure application version number. The entry for any lower-numbered ETSN that is marked as "MAC verified" and is associated with the same secure application version number is now deleted.

3. If the MAC is verified in Step 2 (or Step 4), make an entry in "History Data" for this special payment account number unless it is known that the merchant of this transaction will never send a second authorization-request message for this same transaction. (Some merchants may send a second, or more, authorization-request message for the same transaction if they cannot ship all of the merchandise within a specified time after the transaction.) This History-Data entry includes all of the data discussed above plus the identity of the merchant and the acquirer, and an "expiration date" for this entry. This entry expiration date is a specified time (e.g. 6 months) in the future.

4. If the MAC did not verify in Step 2, then repeat the procedures defined in Step 2 for all other "expected transaction sequence numbers" that were received during the past 48 hours from the oldest to the newest that are not associated with already-verified MACs. Again, if, for any of these trials, the resulting date matches that in the current transaction, the MAC is considered to have been verified. If the MAC verifies, the 20-digit ETSN that resulted in the MAC verification is then marked as "MAC verified" if it is the highest ETSN for the associated secure application version number in question, or deleted if it is not the highest ETSN for the associated secure application version number in question. If the MAC is verified in this step, also perform Step 3.

5. If the MAC does not verify in either Step 2 or Step 4, the "History Data" for the special payment account number in question is accessed. If there is an entry in this data for the same merchant and acquirer that produces the same expiration-date MAC, and this entry has not expired, then accept the MAC. (This is presumed to be an additional authorization-request message for an already-authorized transaction.) If the MAC is accepted because of this entry, the entry expiration date should be made about 2 months in the future if it is less than that, because this may be a "recurring payment" and there may be another authorization-request message for this same transaction in about another month.

If the MAC does not verify in Step 2, Step 4, or Step 5, the transaction must be rejected. In this case a "decline" response is sent to the acquirer and/or the fact that the MAC is not verified is indicated in a special field, such as the security field described above.

In summary, the Check Site notes the presence of the MAC field. The Check Site determines the secret key (as described above), and uses this key to verify the MAC, using essentially the same procedure used in the PC to create the MAC. The system also checks the transaction sequence number, and to do so must maintain transaction-sequence-number information for every version number of every special account number that it processes. It rejects a transaction if:

1. The transaction sequence number is smaller than (or equal to) the largest transaction sequence number for this version of this the secure application received at least 48 hours ago, or
2. The transaction sequence number matches any already-received transaction sequence number for this version of this the secure application. (This may be limited to the transaction sequence numbers received within the past 48 hours.)

If the MAC or the transaction sequence number fails to verify, this facility causes the transaction to be declined and/or indicates the verification failure in an appropriate field, such as the SET security field. If both the MAC and the transaction sequence number verify, this facility causes the transaction to be routed to the issuer.

If the MAC is verified, the central processing facility, or check site, formats an authorization request message for the issuer. The authorization request message may include an indication of whether the MAC was verified.

Use of Pseudo BINs

If an authorization response is routed through the payment network based on an acquirer BIN, in the authorization request message sent to the issuer, MasterCard may replace the acquirer BIN in the transaction message with a special MasterCard BIN that serves as a "pseudo" acquirer BIN. The acquirer BIN is replaced so that the issuer responds to MasterCard instead of to the acquirer. It is not necessary to perform this step if the payment network keeps a record of where the authorization-request message comes from and sends the authorization-response message back to the same place.

If a pseudo acquirer BIN is used, in order for the acquirer and issuer to compute interchange fees correctly, the pseudo acquirer BIN should correspond to the country in which the acquirer is located or to another country or region that will provide the same resultant interchange fees. If each country has a special BIN associated with it, MasterCard may replace the acquirer BIN with the special BIN associated with the acquirer's country. If an acquirer's country does not have a special BIN associated with it, a special BIN associated with another country may be selected that results in the same interchange fees.

If a pseudo acquirer BIN is used, MasterCard stores in a database the acquirer reference data received in the authorization request from the acquirer (hereinafter referred to as the "original Acquirer Reference Data"). In formatting an authorization request message for the issuer, MasterCard replaces the original Acquirer Reference Data with "pseudo" Acquirer Reference Data that includes the pseudo acquirer BIN, an appropriate transaction-type indicator, and an index value that MasterCard can use to find the original Acquirer Reference Data.

It may be more efficient for the secure application Authorization System (or Check Site) to compute and store the MAC-representing expiration date when it receives a new ETSN rather than wait until an actual authorization request is received. Then, when an authorization request is received, it need only compare the expiration date in the authorization request message with those it has pre-computed and stored within the past 48 hours that have not yet matched the expiration date in any previous authorization-request message.

Issuer Handling of Authorization Request

The issuer authorizes the transaction just as it would any other transaction. The authorization response back is routed back to the "pseudo" acquirer, namely the same MasterCard secure application authorization system or Check Site that initially received the special payment account number transaction.

As indicated above, the Check Site sends the authorization response to the acquirer with an indication of whether the MAC was verified. In turn, this message is sent from acquirer to merchant, just as for a normal MasterCard transaction.

Authentication Using an Additional Field

The MAC of the present invention may also be placed in a separate MAC field of (for example) 3 decimal digits. These 13 digits might be as follows:

1. A "Version Indicator" field of one decimal digit: This field normally contains the value "1". However if the cardholder has more than one copy of the secure application for the same special payment account number, (e.g. on a desktop computer and on a laptop computer), additional versions of the secure application will have different numbers in the Version Indicator field. (The secure application transaction sequence numbers are unique to each such version of the secure application.)

2. The secure application transaction sequence number for this version of the secure application, 6 decimal digits: This field increments for each the secure application transaction initiated at this particular computer. (Each computer has its own version of the secure application, and thus will have its own set of sequence numbers.)

3. The MAC itself, 6 decimal digits.

In this situation, a suggested MAC-generation process is as follows:

(a) Represent the 7 digits of the secure application version number (to the left) and the secure application transaction sequence number (for this computer) as binary-coded-decimal, thus producing 28 bits. Left-justify these 28 bits in a 64-bit field, and pad to the right with zero bits.

(b) DE-encrypt the result of Step 1 using as the encryption key the left-most 8 bytes of the Per-Card Key.

(c) DE-Decrypt the result of Step 2 using as the decryption key the right-most 8 bytes of the Per-Card Key.

(d) DEA-encrypt the result of Step 3 using as the encryption key the left-most 8 bytes of the Per-Card Key.

(e) Consider the 64-bit result of Step 4 as 16 hexadecimal digits of 4 bits each. Scan (from left-to right) these 16 hexadecimal digits, selecting the first 6 such digits with value less than or equal to hexadecimal "9". If 6 such digits are not found, find the remaining required digits by re-scanning the digits, this time selecting only digits greater than hexadecimal "9", and subtracting hexadecimal "A" from each.

(f) Use the result of Step 5 as the 6-decimal-digit MAC for this transaction.

The MAC is produced by the secure application in the cardholder's PC, and is to be verified in an appropriate MasterCard secure application facility or Check Site. When produced, the 6 decimal digits resulting from Step 6 are inserted into the MAC field as the actual MAC. When verified, the secure application facility performs the above 6 steps using the left-most 7 digits of the MAC filed, then compares the 6-digit result from Step 6 against the right-most 6 digits of the received MAC field. An exact match indicates an authenticated transaction. A non-match indicates a transaction that must be rejected.

Although preferred embodiments of the invention have been disclosed for illustrative purposes, those skilled in the art will appreciate that many additions, modifications, and substitutions are possible without departing from the true scope and spirit of the invention as defined by the accompanying claims.

We claim:

1. A computerized method of conducting an electronic transaction over a public communications network, with a payment account number having a certain amount of available funds, using a payment network linked to a check site, comprising:

(a) computer generating a secret key associated with said payment account number;

(b) using said secret key to computer generate a message authentication code specific to said transaction;

(c) computer generating an authorization request message including said message authentication code;

(d) forwarding said authorization request message over said payment network to said check site for computer verification of the authenticity of said message authentication code;

(e) verifying the message authentication code by said check site using said secret key; and (f) responding by computer to said authorization request message over said payment network based on said available funds and said transaction amount, wherein said authorization request message is routed over said payment network based on a special bank identification number corresponding to said check site, wherein said authorization request message includes an expiration date field and said message authentication code is placed in said expiration date field, wherein said payment account number is issued by an issuer and said response is provided by said issuer; and further comprising, providing software at a user location for generating said secret key.

2. A computerized method of conducting an electronic transaction over a public communications network with a check site and a payment account number having a bank identification number (BIN) associated with said check site comprising:

(a) computer generating a per-card key associated with said payment account number;

(b) computer generating a message authentication code (MAC) using said per-card key;

(c) computer generating a MAC verification request including said payment account number and said MAC;

(d) verifying said MAC;

(e) based on said verification, and based on a transaction sequence number associated with the electronic transaction, creating an expected transaction sequence number (ETSN) for said MAC;

(f) providing said check site with reference data associated with said ETSN;

(g) computer generating a second message authentication code using said ETSN and said per-card key;
(h) routing said second message authentication code to said check site based on said BIN associated with said check site;
(i) determining said per-card key associated with the payment account number of an unverified message authentication code having associated ETSN and reference data; computer verifying said second message authentication code by said check site using said determined per-card key, and said associated ETSN and reference data;

wherein step (g) further comprises:
(j) converting said second message authentication code into a pseudo expiration date using said reference data;
(k) generating an authorization request having an expiration date field containing said pseudo expiration date; and (l) responding to said authorization request and verifying said second message authentication code based on said pseudo expiration date.

3. The method of claim 2 wherein the step of generating a message authentication code further includes using an expiration date, application version number and transaction sequence number associated with said payment account number.

4. The method of claim 3 wherein said MAC verification request further includes said application version number and said expiration date.

5. The method of claim 4, wherein said step of verifying said MAC includes using said per-card key.

6. The method of claim 2, wherein said reference data includes a reference data and a number of months indicator.

* * * * *